US005825868A

United States Patent [19]
Diamond

[11] Patent Number: 5,825,868
[45] Date of Patent: Oct. 20, 1998

[54] ARRANGEMENT FOR PROVIDING PRIVATE-NETWORK LINE FEATURES ON CENTRAL-OFFICE-TO-PBX TRUNKS

[75] Inventor: William Diamond, Morristown, N.J.

[73] Assignee: Lucent Technologies Inc., Murray Hill, N.J.

[21] Appl. No.: 657,511

[22] Filed: Jun. 4, 1996

[51] Int. Cl.⁶ .................................................. H04M 3/42
[52] U.S. Cl. .................... 379/243; 379/157; 379/198; 379/201; 379/225
[58] Field of Search ..................................... 379/201, 242, 379/243, 245, 246, 250, 230, 229, 231, 232, 233, 234, 196, 197, 198, 219, 220, 221, 269, 157, 225; 370/360, 400, 410

[56] References Cited

U.S. PATENT DOCUMENTS

| | | | |
|---|---|---|---|
| 4,259,549 | 3/1981 | Stehman | 379/204 |
| 4,488,004 | 12/1984 | Bogart et al. | 379/225 |
| 5,247,571 | 9/1993 | Kay et al. | 379/207 |
| 5,329,585 | 7/1994 | Murata et al. | 370/360 |
| 5,361,298 | 11/1994 | Ruel et al. | 379/242 |
| 5,422,943 | 6/1995 | Cooney et al. | 379/225 |
| 5,425,026 | 6/1995 | Mori | 370/410 |
| 5,440,626 | 8/1995 | Boyle et al. | 379/219 |
| 5,454,034 | 9/1995 | Martin | 379/230 |
| 5,517,563 | 5/1996 | Norell | 379/220 |
| 5,539,817 | 7/1996 | Wilkes | 379/230 |

OTHER PUBLICATIONS

Bell System Information, AT&T Provisional, CSS–INF–PKG A/B, Issue 2, Jan. 1976, PBX–Centrex Customer Switching Systems Information Package, pp. A–1/A–2 and B–1 through B–24.

J. R. Abrahams, *Manager's Guide to Centrex,* Artech House, pp. 1–67.

*Primary Examiner*—Harry S. Hong
*Assistant Examiner*—Scott Wolinsky
*Attorney, Agent, or Firm*—David Volejnicek

[57] ABSTRACT

A telephone central office switch (103) provides Centrex features, including intercom dialing, on central-office-to-PBX (133, 134) trunks (123, 124) by using the 4-wire subscriber feature of the Lucent Technologies 5ESS® switch to administer trunk ports (113–114) that serve the central-office-to-PBX trunks as 4-wire telephone lines and then further administering those trunk ports for Centrex features. Those trunk ports, and optionally also some line ports (115–116), may be administratively assigned the private network numbering plan of respective PBXs so as to enable intercom dialing among those trunk ports, and between those trunk ports and the optional line ports.

14 Claims, 2 Drawing Sheets

ARRANGEMENT FOR PROVIDING PRIVATE-NETWORK LINE FEATURES ON CENTRAL-OFFICE-TO-PBX TRUNKS

TECHNICAL FIELD

This invention relates generally to telecommunications, and relates specifically to telephony switching systems and features.

BACKGROUND OF THE INVENTION

A primary differentiator of private telecommunications systems (such as those that are commonly implemented and owned by large businesses for their internal use) from public telecommunications systems (the telephone companies' systems) is their feature-richness: the private telecommunications systems typically provide many features that are commonly not provided in the public network. Such features include a plethora of forwarding features, transfer features, conferencing features, intercom dialing features (i.e., dialing using a private-network numbering plan, such as a four-digit or five-digit numbering plan as opposed to the public network 7-digit and 10-digit numbering plan), hunt features, call-treatment codes, hot line service, etc. In the private telecommunications systems, these features are provided by private branch exchanges (PBXs) to users' terminal equipment that is connected to the PBXs via PBX extension telephone lines.

A well-known service called Centrex can be used to provide a private telecommunications network from a public telephone service-provider's central office. In the Centrex service, the central office takes the place of the PBX and provides the abovementioned features (referred to as Centrex features) to customers' terminal equipment that is connected to the central office via Centrex telephone lines.

Some private networks provide a capability referred to as "feature transparency", whereby remote terminal equipment that is connected by PBX extension lines to one PBX, may be used to invoke features with respect to terminal equipment that is connected to another PBX by PBX extension lines, as if the remote terminal equipment were connected to the other PBX by PBX extension lines. An example thereof is disclosed in U.S. Pat. No. 4,488,004. The inter-PBX connections may be accomplished in a number of ways: by inter-PBX trunks that are a part of the private network; by trunks that are leased from the public service provider and are dedicated for use as inter-PBX trunks; or by means of a software-defined network (SDN) service of the public service provider that enables the private network to use trunks of the public network just like leased trunks on an as-needed basis.

To summarize the above, PBX and Centrex features can be provided to telephone lines directly by PBXs and central office switching systems, and indirectly across telephone trunks by PBXs.

It will be noted, however, that in neither case can the PBX or Centrex features be provided to the telephone trunks themselves. For example, unlike a telephone line, a telephone trunk normally cannot be forwarded, transferred, conferenced, hot-line connected, etc.

SUMMARY OF THE INVENTION

This invention is directed to alleviating the shortcomings of the prior art. I have recognized that there are good reasons for, and valuable benefits to be derived from, providing private-network line features (e.g., Centrex features) to telecommunications inter-switching-system trunks, and in particular to central-office-to-PBX trunks. For example, I have realized that enabling the central office to forward calls from a trunk leading to a PBX which does not answer on that trunk to another trunk, preferably one leading to another PBX of the same customer, allows the customer to continue to receive all incoming calls without losing any of the calls even in the face of failure of one or more of the customer's trunk ports or even an entire PBX. For another example, I have realized that enabling intercom dialing (dialing via the private-network numbering plan) on trunks allows the customer to do intercom dialing between different types of facilities, such as between central-office-to-PBX trunks, between such trunks and central office telephone lines, and between analog trunks and digital trunks, yet do so transparently to users and without incurring the cost of having the calls treated (e.g., billed by the central office switch) as if they were transported through the public network. This enables the customer to mix-and-match equipment that uses different types of facilities without incurring public-network charges for calls made between these facilities.

Therefore, according to one aspect of the invention, in a telephone switching system (such as a public telephone network central office, for example) that includes a plurality of trunk ports each for serving another switching system (such as a PBX) that is connected to the trunk port by a telephone trunk, and means (such as a call-processing arrangement, for example) that provides telephone line features (such as Centrex features, for example) to telephone lines that are connected to line ports that serve terminal equipment which is connected to the line ports by the telephone lines, there is provided an arrangement that causes the feature-providing means to treat at least one of the trunk ports as a line port and provide the telephone-line features on those telephone trunks that are connected to the at least one trunk port. According to another aspect of the invention, there is provided a telecommunications network that includes the above-characterized telephone switching system and the other switching system and wherein the two switching systems are interconnected by the at least one trunk. And according to yet another aspect of the invention, there is implemented a method of providing telephone line services on telephone trunks by a telephone switching system. The switching system conventionally provides telephone line services, including telephone line features, on telephone lines that are connected to line ports of the telephone switching system and that serve terminal equipment that is connected by the telephone lines to the line ports. The switching system conventionally also provides telephone trunk services on first telephone trunks that are connected to first trunk ports of the telephone switching system and that serve other switching systems that are connected to the first trunk ports by the first telephone trunks. Significantly, the switching system further provides the telephone line services, including the telephone line features, on second telephone trunks that are connected to second trunk ports of the telephone switching system and that serve other switching systems that are connected to the second trunk ports by the second telephone trunks.

Preferably, the above-characterized switching system is a public network central office, but the at least one of the trunk ports or the second trunk ports are assigned a private network numbering plan so that communications to and from those trunk ports are addressable by addresses included in the private network numbering plan. Further preferably, some of the line ports of the public network central office are also assigned the private network numbering plan so that communications between the at least one of the trunk ports or the second trunk ports and said some of the line ports also are addressable by addresses included in the private network numbering plan.

These and other advantages and features of the present invention will become more apparent from the following description of an illustrative embodiment of the invention taken together with the drawing.

DETAILED DESCRIPTION

Figure 1:
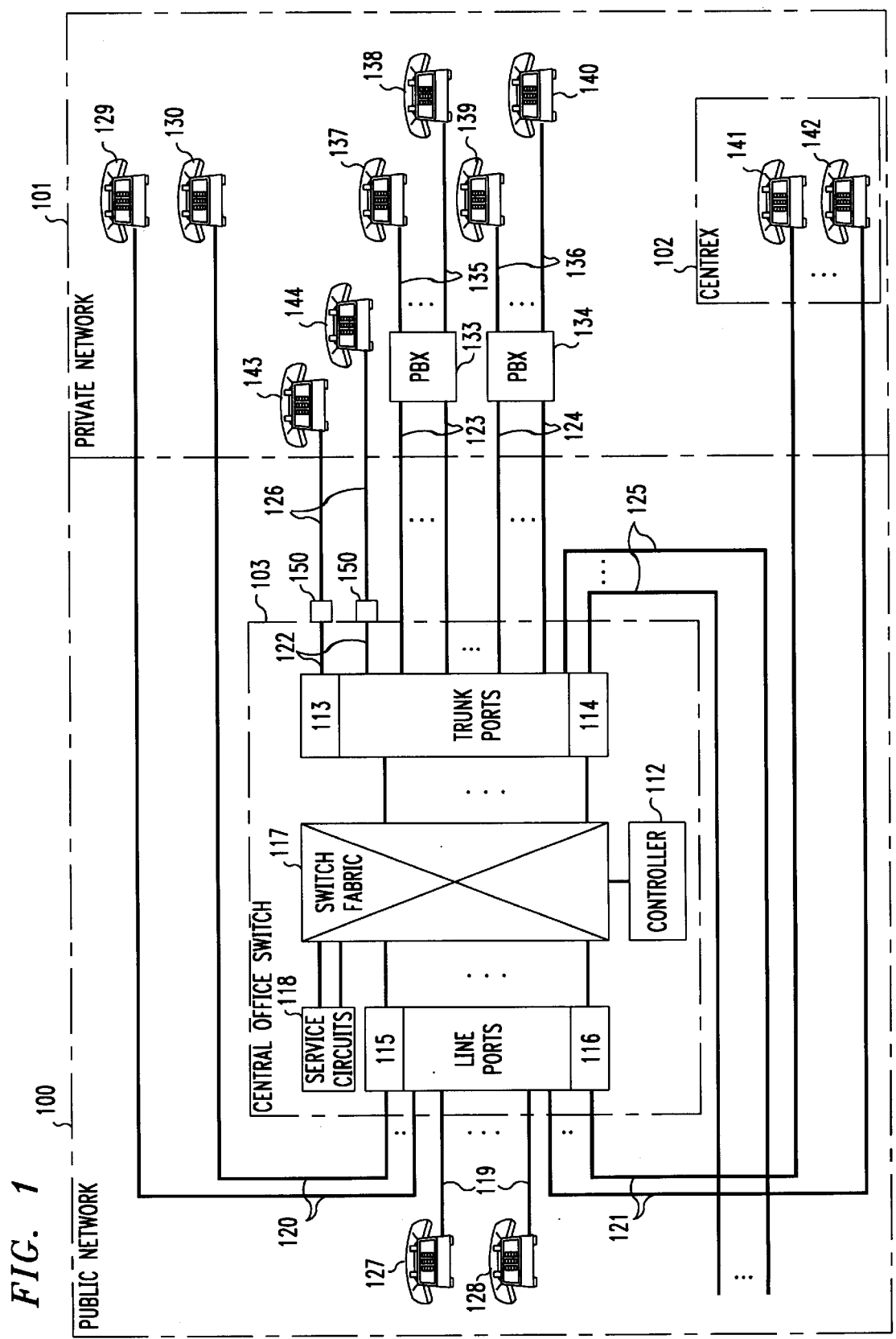
FIG. 1 is a block diagram of a telecommunications system that embodies an illustrative implementation of the invention.

FIG. 1 shows an illustrative telecommunications system configured according to the invention. The telecommunications system comprises a public network 100 and a private network 101. Public network 100 includes a central office switch 103, which is preferably the Lucent Technologies 5ESS® central office switch. Switch 103 conventionally comprises a plurality of line ports 115–116 for connecting switch 103 to a plurality of telephone lines 119–121; a plurality of trunk ports 113–114 for connecting switch 103 to a plurality of telephone trunks 122–125; a switching fabric 117 that selectively interconnects line ports 115–116 with each other, trunk ports 113–114 with each other, and line ports 115–116 with trunk ports 113–114; and a controller 112 which controls the operation of the components of switch 103. Switch 103 also includes service circuits 118 which are selectively interconnected by switching fabric 117 under control of controller 112 with line ports 115–116 for providing features and other services to equipment 127–130 and 141–142 that is connected by telephone lines 119–121 to line ports 115–116. Some of the telephone lines 119–121 may be Centrex lines 121 connected to equipment 141–142 of private network 101 and forming therewith a portion of private network 101, referred to as a Centrex 102, in which case service circuits 118 include circuits for providing Centrex features on telephone lines 121.

Trunks 125 interconnect switch 103 with other switches (not shown) of public network 100, while trunks 123–124 connect switch 103 with private branch exchanges (PBXs) 133–134, respectively, of private network 101. Trunks 123 and 124 are referred to herein as central-office-to-PBX trunks. Each PBX 133, 134 is in turn connected by PBX extension lines 135,136, respectively, to telecommunications terminal equipment 137–138, 139–140 respectively, of private network 101. Equipment 137–138 and 139–140 illustratively comprises PBX telephones. Switch 103 provides conventional line services, including line features, on telephone lines 119–121, and provides conventional trunk services on trunks 123–125. Similarly, PBXs 133 and 134 provide conventional line services, including PBX extension-line features, on extension lines 135–136, and provide conventional trunk services on trunks 123 and 124.

Calling within public network 100 is effected via the public network numbering plan, e.g., via the 7-digit and 10-digit telephone numbers of the North American numbering plan. For example, if a user of terminal equipment in public network 100 (such as a terminal 127) wants to reach some other terminal equipment in public network 100 (such as a terminal 128), or terminal equipment in private network 101, the user dials the public-network 7-digit or 10-digit number of the destination terminal equipment; the same is true for a user of a terminal of private network 101 who desires to reach a terminal of public network 100. For this reason, lines 119 and trunks 125 (or, more precisely, line ports 115–116 of lines 119 and trunk ports 113–114 of trunks 125) are administratively assigned the public network numbering plan.

In contrast, calling within private network 101 is effected via the private network numbering plan, e.g., via the 4-digit and 5-digit telephone numbers of that plan. For example, if a user of a terminal 137 wants to reach another terminal 138, if a user of a terminal 139 wants to reach another terminal 140, or if a user of a terminal 141 wants to reach another terminal 142, he or she dials the destination terminal's 4-digit extension. For this reason, line ports 115–116 of lines 121 are administratively assigned the private network numbering plan. If a user of a terminal 137 wants to reach a terminal 139 or 141, if a user of a terminal 139 wants to reach a terminal 137 or 141, or if a user of a terminal 141 wants to reach a terminal 137 or 139, he or she also dials the destination terminal's 4-digit extension preceded by a 1-digit identifier of either the PBX 133–134 which serves the destination terminal or the Centrex 102 of which the destination terminal is a member. However, in these cases of calling between PBXs 133–134, or from a PBX 133–134 to Centrex 102, the 5-digit private-network number is translated by the call-originating PBX into a corresponding 7-digit public-network number, so that trunk ports 113–114 of switch 103 only use public-network numbers for call-connection establishment. Likewise, in the case of calling from Centrex 102 to a PBX 133–134, the 5-digit private network number is translated by a service circuit 118 into a corresponding 7-digit public-network number, so that trunk ports 113–114 of switch 103 only use public-network numbers for call-connection establishment. In other words, all trunk ports 113–114 are administratively assigned the public network numbering plan.

Figure 2:
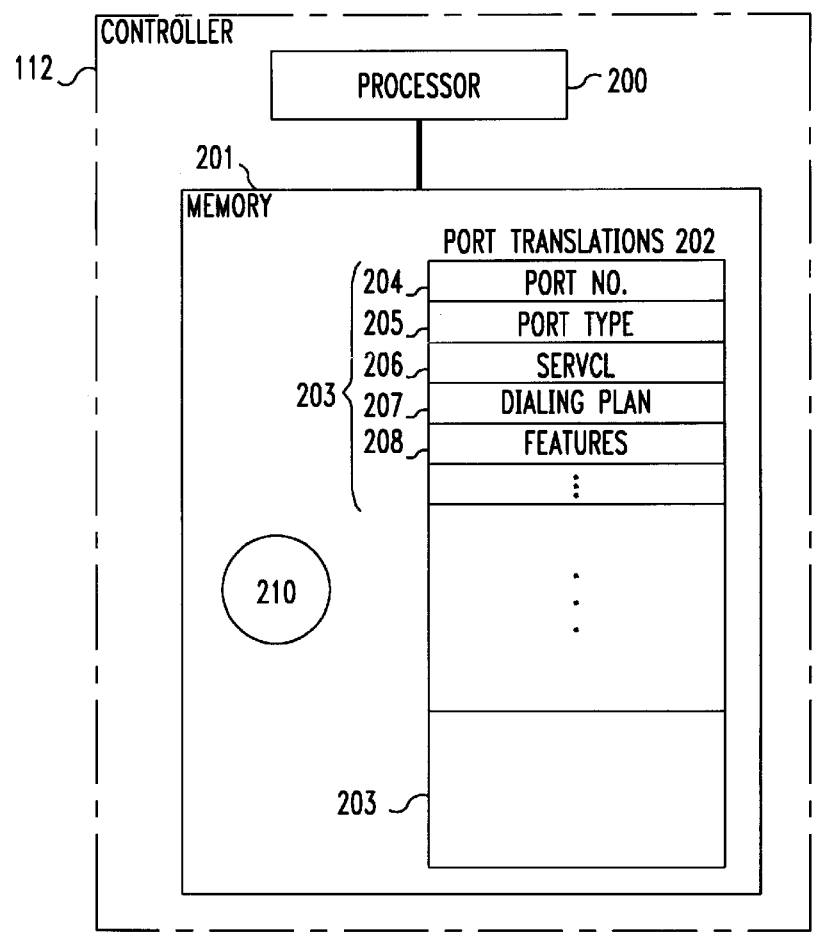
FIG. 2 is a block diagram of the controller of the central office switch of the telecommunications system of FIG. 1.

The services which central office switch 103 gives to individual ports 115–116 and 113–114 and their connected lines and trunks is determined by port translations data 202 which is stored in a memory 201 of controller 112, as shown in FIG. 2. Port translations data 202 includes an entry 203 for each port 115–116 and 113–114. Each entry 203 includes a variety of data items, including a port number 204, a port type 205, and a class-of-service (SERVCL) 206. In the case of line ports 115–116, the entry data includes the numbering plan 207 to which this port is assigned and the features 208 which are active for this port. Also included in memory 201 are control programs, including call-processing 210, which use port translations data 202 during their execution by a processor 200.

In this illustrative embodiment of the invention, switch 103 is a Lucent Technologies 5ESS central office switch that includes a 4-wire subscriber feature (also referred to as a 4-wire-line feature). By means of this feature, the 5ESS switch effectively converts a trunk port into a line class-of-service, and thereby permits line terminal equipment such as telephones 143–144 to be connected via telephone lines 126 to trunk ports 113–114. In the public documentation of the 5ESS switch, this feature is described as follows:

10.2.25.28 99-5E-0238 AUTOVON-4-WIRE LINE SERVICE

This feature allows 4-wire E&M trunks to receive line type services.

The AUTOVON network provides service to 4-wire telephone sets via the 4-wire E&M trunk interface at the serving tandem or class 4/5 office.

5ESS® Switch System Description, AT&T document no. 235-100-125, Issue 8.00, Release November 1995.

5.3.32.2.2 SERVCL

Description: This field describes originating service and feature handling by Class of Service Required Field

| Valid SERVCL Entries | |
|---|---|
| Entry | Definition |
| 4 WINDIV | Software Release: 5E3 and later. 4-Wire Individual Line or 4-Wire Manual PBX. Allows an entry of "D" or "T" for the OE TYPE field on the Line Form (5109 Record) and MLHLN form (5111 Record). |

Translation Guide 5ESS® Switch (TG-5), AT&T document no. 235-080-100, Release December 1995.

5.1.6.2.5 OE TYPE

Description: This field is used in conjunction with the OE NUMBER field to define Equipment Types and Numbers (see the OE TYPE and the OE NUMBER tables below).

OE TYPE was added to this form, effective with the 5E3 and later to accommodate the addition of 4-Wire Analog Lines (TEN) and 4-Wire Digital Lines (DEN).

| Valid OE TYPE Entries | |
|---|---|
| Entry | Definition |
| D | The TN is associated with a 4-wire Digital Equipment Number and Number field must contain an 8-digit DEN. |
| T | The TN is associated with a 4-wire analog Trunk Equipment Number and Number field must contain a 7-digit TEN. |

Id

Figure 3:
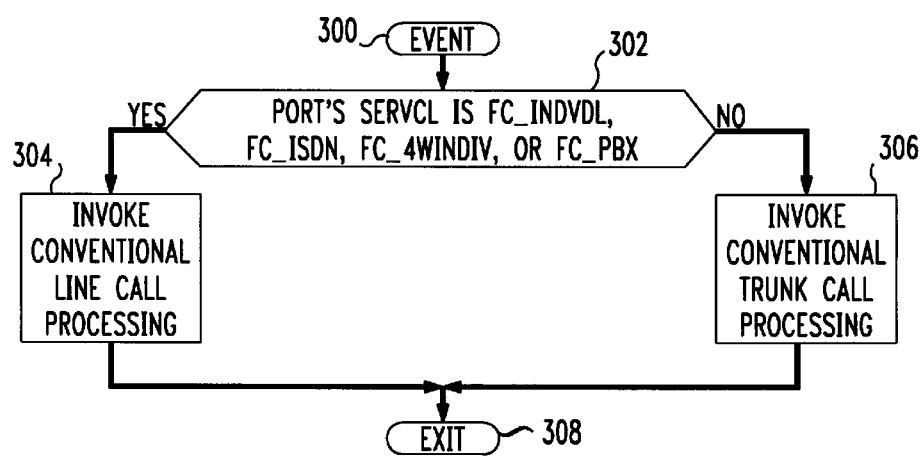
FIG. 3 is a functional-flow diagram of a call-processing function of the controller of FIG. 2.

Controller 112 of the 5ESS switch lumps 2-wire (FC-INDVDL), ISDN (FC-ISDN), 4-wire (FC-4WINDIV) and PBX (FC-PBX) classes-of-service into the same category for call-processing purposes. Included in call-processing 210 is the function shown in FIG. 3. When call-processing 210 is informed of occurrence of an event by a port 115–116 or 113–114 (e.g., dialed digit, button push, wink, etc.), at step 300, it checks port translations data 202 to determine if the port's class-of-service (SERVCL) is one of the above-mentioned four types, at step 302. If so, the function invokes line call-processing functions to process the event, at step 304; if not, the function invokes trunk call-processing functions to process the event, at step 306. The function then exits to await occurrence of another event, at step 308. (In special cases where the Precedence-and-Preemption (PP) BRCS feature is used, the 4-wire line is lumped in with trunks. This is because trunk signaling (winks) is used to interrupt a stable call in the ringing or talking state.)

The 4-wire subscriber feature causes call processing of switch 103 to treat a trunk port 113–114 as a line port 115–116. So once it is assigned the 4WINDIV class-of-service, a trunk port 113–114 may be further administered as a line port 115–116, including having conventional Centrex line features and/or a private network numbering plan assigned thereto in port translations data 202.

To complete the conversion of a trunk port 113–114 into a line class-of-service, each trunk port 113–114 that is administered for the 4-wire subscriber feature in the manner described above is also equipped with a protocol converter 150 at its trunk interface 122. Protocol converter 150 connects trunk interface 122 to a telephone line 126 and converts between trunk signaling on the trunk-interface side and line signaling on the line side, and also provides ringing signals on the line side. Protocol converter 150 is illustratively the Tellabs PAX 334 unit.

It is by means of the 4-wire subscriber feature that switch 103 provides private-network line features, such as Centrex features, to analog ones of trunks 123–124. Illustratively, all trunks 123–124 may be analog trunks. Alternatively, some trunks 123–124 may be digital trunks. Although the 4-wire subscriber feature is not presently applied to digital trunks, such extension is envisioned. Further according to the invention, private network 101 may include equipment 129–130 which is connected by telephone lines 120 to line ports 115–116 of switch 103 yet which appears to users of equipment 129–130 as being connected by PBX extension lines 135 or 136 to, and being served by, PBX 133 or 134, respectively. Likewise, equipment 143–144 may be made to appear to users thereof as being connected by PBX extension lines 135 or 136 to, and being served by, PBX 133 or 134. This is effected via the 4-wire subscriber feature, by assigning the 4-wire-line class-of-service to ports 115–116 of lines 120 and 126, administering these ports 115–116 for Centrex features, and administratively assigning these ports 115–116 to the same numbering plan as trunk ports 113–114 of trunks 123 and 124 that are administered for the 4-wire subscriber feature (i.e., the private numbering plan of PBXs 133 and 134). The net effect thereof is that, for call processing purposes, central office switch 103 treats trunks 123 and 124 and lines 120 and 126 as if they were Centrex lines 121 of a Centrex system 102.

Of course, various changes and modifications to the illustrative embodiment described above will be apparent to those skilled in the art. These changes and modifications can be made without departing from the spirit and the scope of the invention and without diminishing its attendant advantages. It is therefore intended that such changes and modifications be covered by the following claims.

The invention claimed is:

1. A telephone switching system comprising:
    a plurality of trunk ports each for serving another switching system connected to the trunk port by a telephone trunk;
    means for providing telephone line features on telephone lines connected to line ports that serve terminal equipment which is connected to the line ports by the telephone lines; and
    means for causing the feature-providing means to treat at least one of the trunk ports as a line port so as to provide the telephone line features on telephone trunks that are connected to the at least one trunk port.

2. The telephone switching system of claim 1 wherein:
    the causing means comprise
        port translations means for administering the at least one trunk port as a line port.

3. The telephone switching system of claim 1 wherein:

the causing means comprise
means for administering the at least one trunk port for a four-wire-line class-of-service.

4. The telephone switching system of claim 1 wherein:

the telephone line features provided by the providing means comprise Centrex features; and the causing means comprise
means for administering the at least one trunk port as a line port connected to a Centrex line.

5. The telephone switching system of claim 1 wherein:

the at least one trunk port is assigned a private network dialing plan of a private telephone network so that communications to and from the at least one trunk port are addressable by addresses included in the private network dialing plan.

6. The telephone switching system of claim 1 wherein:

the telephone switching system is a central-office switch of a public telephone network; and the other switching system served by the at least one trunk port is a private-branch exchange of a private telephone network.

7. The telephone switching system of claim 6 wherein:

the at least one trunk port is assigned a private network dialing plan of the private telephone network; and the telephone switching system further comprises
at least one of the line ports, and
means for assigning the at least one line port the private network dialing plan, so that communications between the at least one line port and the at least one trunk port are addressable by addresses included in the private network dialing plan.

8. A public telephone network central office switching system comprising:

a plurality of trunk ports each for serving another switching system connected to the trunk port by a telephone trunk;

a plurality of line ports each for serving terminal equipment connected to the line port by a telephone line;

means for providing telephone line features on telephone lines connected to the line ports, including providing Centrex features on at least some of the telephone lines; and means for causing the feature-providing means to treat at least one of the trunk ports, which serves another switching system that is a private branch exchange of a private telephone network, as a line port so as to provide the Centrex features on the at least one telephone trunk connected to the at least one of the trunk ports.

9. The public telephone network central office switching system of claim 8 wherein:

the causing means comprise
port translations means for administering the at least one trunk port as a Centrex line port.

10. The public telephone network central office switching system of claim 9 wherein:

the port translations means comprise
port translations means for administering the at least one trunk port for a four-wire-line class of service.

11. The public telephone network central office switching system of claim 8 wherein:

the causing means include
means for assigning the at least one trunk port a private network dialing plan of the private telephone network so that communications to and from the at least one trunk port are addressable by addresses included in the private network dialing plan; and others of the trunk ports are assigned a public network dialing plan of the public telephone network.

12. The public telephone network central office switching system of claim 11 wherein:

some of the line ports are assigned a public network dialing plan of the public telephone network; and the assigning means are further for assigning others of the line ports the private network dialing plan, so that communications between the at least one trunk port and the others of the line ports are addressable by addresses included in the private network dialing plan.

13. A telecommunications network comprising a first telephone switching system;

at least one telephone trunk connected to the first telephone switching system; and a second telephone switching system comprising
a plurality of trunk ports each for serving another switching system connected to the trunk port by a telephone trunk, at least one of the trunk ports being connected to the at least one telephone trunk;

means for providing telephone line features on telephone lines connected to line ports that serve terminal equipment which is connected to the line ports by the telephone lines; and means for causing the feature-providing means to treat the at least one of the trunk ports as a line port so as to provide the telephone line features on the at least one telephone trunk that is connected to the at least one of the trunk ports.

14. A method of providing telephone services on telephone trunks by a telephone switching system, comprising the steps of:

providing telephone line services including telephone line features on telephone lines connected to line ports of the telephone switching system that serve terminal equipment connected by the telephone lines to the line ports;

providing telephone trunk services on first telephone trunks connected to first trunk ports of the telephone switching system that serve other switching systems connected to the first trunk ports by the first telephone trunks; and providing the telephone line services including the telephone line features on second telephone trunks connected to second trunk ports of the telephone switching system that serve other switching systems connected to the second trunk ports by the second telephone trunks, by treating the second trunk ports as line ports.

* * * * *